United States Patent [19]

Lundin et al.

[11] 4,415,716

[45] Nov. 15, 1983

[54] PROCESS FOR THE POLYMERIZATION OF ETHYLENICALLY UNSATURATED MONOMERS

[75] Inventors: Claes O. A. Lundin, Saltsjö-boo; Berit I. Simonsson, Solna, both of Sweden

[73] Assignee: KenoGard AB, Stockholm, Sweden

[21] Appl. No.: 228,951

[22] Filed: Jan. 27, 1981

[30] Foreign Application Priority Data

Jan. 28, 1980 [SE] Sweden ............................... 8000668

[51] Int. Cl.$^3$ .............................................. C08K 5/06
[52] U.S. Cl. ............................... 526/209; 526/344.2; 502/160
[58] Field of Search ..................... 526/209; 252/426

[56] References Cited

U.S. PATENT DOCUMENTS 4,039,475  8/1977  Oosterwijk et al. ............ 252/431 R
4,092,470  5/1978  Oosterwijk et al. ................ 526/227

FOREIGN PATENT DOCUMENTS 2629467  1/1978  Fed. Rep. of Germany .

OTHER PUBLICATIONS

"Pharmaceutical Emulsions and Emulsifying Agents", Lawrence M. Spalton, B. Pharm., London, 1949, pp. 67-80.

Primary Examiner—Joseph L. Schofer
Assistant Examiner—Bernard Lipman
Attorney, Agent, or Firm—Fred Philpitt

[57] ABSTRACT

A process for the polymerization of ethylenically unsaturated monomers wherein a solid, monomer-soluble, free-radical forming compound is used as initiator. The initiator is charged to the polymerization system in the form of an aqueous dispersion comprising an emulsifier combination which consists of an ethoxylated nonionic emulsifier with an HLB-value above 15, which does not contain cyclic inner ether bonds, and a non-ethoxylated nonionic emulsifier with an HLB-value below 9. The emulsifier combination has a resulting HLB-value within the interval 11-17 and the combination is used in an amount of at least 1% by weight based on the initiator. Polymerizates produced according to the method have good electric insulation properties. A means suitable for the polymerization of ethylenically unsaturated monomers consists of an aqueous dispersion of a free-radical forming initiator, which dispersion comprises the mentioned emulsifier combination in an amount of at least 1 percent by weight, based on the initiator. The dispersion preferably also contains a protrective colloid such as polyvinyl alcohol. The dispersions have good stability and are easy to handle.

10 Claims, No Drawings

PROCESS FOR THE POLYMERIZATION OF ETHYLENICALLY UNSATURATED MONOMERS

The present invention relates to a process for the polymerization of ethylenically unsaturated monomers wherein solid, monomer-soluble, free-radical forming compounds are used as initiators. More particularly the invention relates to a process wherein the initiator is charged to the polymerization system in the form of an aqueous dispersion, comprising a specific emulsifier system. The invention also relates to a means suitable for carrying out the polymerization process.

Polymers of ethylenically unsaturated monomers, such as polyvinyl chloride and copolymers based on vinyl chloride, are to a great extent used for insulation of cables and other electric materials. It is, in this connection, essential that the electric insulating power, the volume resistivity, is as high as possible, in order to avoid electric losses. At polymerization of e.g. vinyl chloride in aqueous systems, protective colloids and/or emulsifiers are used to obtain the desired particle size of the polymerizate, and free-radical forming initiators are used to carry out the polymerization. When these chemicals are used, their influence on the properties of the finished polymerizate must be carefully considered. Above all, certain types of these additives have a detrimental effect on the volume resistivity of the polymerizate.

As solid, monomer-soluble, free-radical initiators use can be made of organic peroxides such as aromatic and aliphatic diacyl peroxides, dialkyl peroxides and dialkyl peroxydicarbonates, mixed anhydrides of organic sulphoperacids and organic acids, and also azo compounds. It is of course possible to charge initiators of this type to the polymerization system in solid form or dissolved in organic solvents. However, these methods of feeding are not satisfactory with respect to handling and occupational environment. Therefore, development has, in the last few years, been centered on the preparation of aqueous dispersions of the solid initiators, which dispersions can be used in closed systems.

U.S. Pat. No. 3,825,509 describes a process for suspension polymerization of vinyl chloride in which process the initiator is charged in the form of an emulsion, containing an emulsifier of the ethoxylated polyol-ester type, and more specifically polyoxyethylene sorbitan monolaurate, and polyvinyl alcohol. Further, dispersions of solid peroxides wherein the emulsifier system is a combination of two or more emulsifiers are known from the U.S. Pat. No. 4,039,475. This patent specification describes initiator suspensions which are suitable for use in the polymerization of vinyl chloride and which suspensions contain a combination of a nonionic emulsifier with an HLB-value not higher than 12.5 and a nonionic emulsifier with an HLB-value not lower than 12.5. Alternatively, combinations of nonionic emulsifiers with an HLB-value not higher than 12.5 and anionic emulsifiers can be used according to the patent. Ethoxylated emulsifiers have mainly been used as the nonionic emulsifiers. It is also known to use different cationic and anionic emulsifiers, as described for example in the German patent application No. 26 29 467.

The dispersions mentioned above have varying degrees of stability and most of them do not give stable initiator dispersions, but only dispersions which are pumpable or which are stable only for a shorter period of time. Another disadvantage of hereto known dispersions is that the emulsifiers used, to a varying extent, often impair the electric properties of the produced polymerizate, and the products can then only to a minor extent be used for example in the cable industry. Furthermore, many of the suggested emulsifiers will have a negative effect on the emulsifiers and protective colloids which are most commonly used for polymerization so that it, when using the initiator dispersions, will not be possible to use conventional polymerization recipes without modifications or without impairing the properties of the polymerizate.

It has now been found that a combination of certain types of emulsifiers give dispersions of solid, monomer-soluble free-radical forming initiators, which dispersions are stable on storage, easy to handle and do not give rise to any appreciable negative effects on the electric insulation property of the produced polymerizate. Neither do the dispersions seem to have any considerable influence on the conventionally used protective colloids or emulsifiers, and modifications of the polymerization recipes can thus be avoided when the present dispersions are used.

The present invention thus relates to a process at the polymerization of ethylenically unsaturated monomers wherein a solid, free-radical forming compound is used as initiator and is charged in the form of an aqueous dispersion. The initiator dispersion which is charged to the polymerization system comprises an emulsifier system which consists of (a) an ethoxylated nonionic emulsifier with an HLB-value above 15, which emulsifier does not contain cyclic inner ether-bonds, and (b) a non-ethoxylated nonionic emulsifier with an HLB-value below 9, whereby the total amount of emulsifiers is at least 1 percent by weight based on the amount of the solid initiator, and whereby the resulting HLB-value of the emulsifier combination is within the range of 11–17.

By HLB-value is to be understood the hydrophilic-lipophilic balance as described in "The Atlas HLB-System, a time saving guide to emulsifier selection" published by Atlas Chemical Industries Inc., 1963, and by resulting HLB-value is to be understood the HLB-value for blends of emulsifiers, which value can be calculated with respect to the weight ratio of the components, as likewise described in the mentioned publication.

The present method can be used in current known methods for the polymerization of ethylenically unsaturated monomers in aqueous systems, wherein monomer soluble initiators are used. As examples of ethylenically unsaturated polymerizable compounds can be mentioned: vinyl aromatic compounds, e.g. styrene and substituted styrenes such as p-chlorostyrene, esters of aliphatic alpha-methylene carbonic acid, preferably lower alkyl esters, e.g. methylacrylate, ethylacrylate, methyl methacrylate, ethyl methacrylate, acrylic acid nitrile, vinyl esters, e.g. vinyl acetate, vinyl halides, vinyl ethers, e.g. vinyl methylether, vinylidene chloride and lower alkenes, e.g. butadien. The present method is preferably used at polymerization of vinyl chloride or vinyl chloride and up to 20 percent by weight, based on the vinyl chloride, of copolymerizable monomers, such as alkenes, vinyl acetate, vinylidene chloride, acrylic acid and methacrylic acid, acrylates and methacrylates, acryl nitrile and methacryl nitrile, vinyl esters etc., by known suspension and microsuspension polymerization methods.

It has surprisingly been found that the particular emulsifier system which is used for the initiator dispersion does not have any substantial negative effect on the electric insulation power of the produced polymer, and the produced polymer satisfies the requirements which can be set for the use thereof in electric insulating materials. The values for the volume resistivity, which are obtained when an initiator dispersion according to the invention is used, are fully comparable with those obtained when the initiator is charged in powder form, i.e. without addition of extra chemicals.

To carry out polymerization using initiator dispersion, it is also required that the dispersion has a suitable viscosity, both with respect to easy handling for the charging and to the distribution in the polymerization system. The dispersions of the invention fulfil these requirements and they also show a very satisfactory stability.

It has been found that it, in order to avoid unacceptable changes in the electric insulating power of the polymer, is essential not only to avoid the use of ionic emulsifiers in the initiator dispersions, but also that specific demands must be made on the used nonionic emulsifiers.

It has thus been found that it is essential that ethoxylated nonionic emulsifiers have comparatively high HLB-values i.e. that they have distinct hydrophilic tendencies. In order to obtain dispersions which fulfil all the requirements, it is also essential that this type of emulsifier does not contain cyclic inner ether-bonds, i.e. that they are not anhydro derivatives of polyhydric alcohols.

According to the present invention a nonionic ethoxylated emulsifier with an HLB-value above 15 is used, and this emulsifier will hereinafter be referred to as the hydrophilic emulsifier. The hydrophilic emulsifier must not contain cyclic inner ether bonds and it is suitably selected from the groups consisting of ethoxylated alkylphenols, ethoxylated fatty acids, ethoxylated glycol- and glycerol-fatty esters, alkylene oxide blockcopolymers. The HLB-value for the hydrophilic emulsifier should preferably exceed 17. A suitable upper limit for the value is 25. Preferred hydrophilic emulsifiers are the ethoxylated alkylphenols, fatty alcohols and fatty acids and particularly preferred are the ethoxylated fatty acids. By ethoxylated nonionic emulsifiers is to be understood, as far as derivatives of acids and different alcohols are concerned, that they contain predominantly ethylene oxide groups, but other lower alkylene oxide groups, such as propylene oxide, may be present. Preferably all of the alkylene oxide groups are ethylene oxide groups.

The nonionic emulsifier with a comparatively low HLB-value, below 9, in the dispersions have lipophilic tendencies and will hereinafter be referred to as the lipophilic emulsifier. This emulsifier must not contain ethoxy groups as it has been found that it will then have a negative effect on the electric properties. Suitable lipophilic emulsifiers are the partial fatty acid esters of polyhydric alcohols having 2 to 8 carbon atoms, or anhydro derivatives thereof, i.e. fatty acid esters containing at least one free hydroxyl group. Suitable polyvalent alcohols, or anhydro derivatives thereof, comprise glycols such as ethylene glycol, propylene glycol, glycerol, diglycerol and higher glycerols, polyols such as xylitol, pentaerythritol, sorbitol and anhydro derivatives of these and similar polyols. It is preferred that the lipophilic emulsifier does not contain cyclic inner ether bonds and that it consists of a partial fatty acid ester of alcohols which originally have three hydroxyl groups at the most. Particularly suitable are the partial fatty acid esters of glycerol. The lipophilic emulsifier preferably has an HLB-value below 7. A suitable lower limit for the HLB-value is 0.5.

Instead of one emulsifier from the respective group it is of course possible to use two or more, as long as the above mentioned requirements are met, and as long as the resulting HLB-value for a blend of two or more hydrophilic or two or more lipophilic emulsifiers is above 15 or is below 9, respectively.

In the method of the invention solid, oil-soluble radical-initiators are used and suitable such initiators are different types of solid organic peroxides, mixed anhydrides of organic sulfoperacids and organic acids, and azo compounds. Known azo compounds for initiation of polymerization are e.g. azovaleronitrile and azobisisobutyronitrile. Preferably solid organic peroxides are used and hereby is to be understood peroxides which are stable at a temperature of about 20° C. As examples of groups of such peroxides can be mentioned aromatic and aliphatic diacyl peroxides, e.g. dibenzoyl peroxide and dilauryl peroxide, dialkyl and diaralkyl peroxides such as dicumyl peroxide, hydroperoxides, peresters, perketals, ketone peroxides, peroxydicarbonates. At the polymerization solid dialkyl peroxydicarbonates are preferably used and as examples of such can be mentioned dimyristyl-, dicetyl-, distearyl-, dicyclohexyl- and di-4-tert. butylcyclohexyl-peroxydicarbonate.

The dispersion may have a solid content of initiator of up to about 40 percent by weight and the solid content suitably exceeds 15 percent by weight. The total amount of the emulsifier combination should be at least 1 percent by weight, based on the initiator. The total emulsifier amount should not exceed 15 percent by weight. Protective colloids or thickening agents may of course also be present in the dispersions.

For polymerization using the present initiator dispersions the amount of initiator is calculated in the same manner as for polymerization using solid initiators which are not in the form of dispersions, and this means that the amount of initiator generally is within the range of 0.01 to 2 percent by weight based on the weight of the monomer. In polymerization with the present dispersions conventionally used polymerization recipes can be used, and other polymerization agents can be used in accustomed amounts.

The invention also relates to a means, suitable for use in polymerization of ethylenically unsaturated monomers in aqueous systems. The means is an aqueous dispersion of a solid, monomer-soluble, free-radical forming compound, suitably a solid organic peroxide and preferably a solid dialkyl peroxydicarbonate, which dispersion contains an emulsifier system consisting of at least one hydrophilic emulsifier and at least one lipophilic emulsifier as hereinbefore respectively defined, whereby the emulsifier combination has a resulting HLB-value within the range 11–17 and is present in the dispersion in an amount of at least 1 percent by weight, based on the free-radical forming initiator. The total amount of emulsifiers should not exceed 15 percent. The amount is suitably within the range of 1 to 10 percent by weight and preferably within the range of 1 to 5 percent by weight.

The hydrophilic emulsifier in the dispersions have an HLB-value above 15 and preferably above 17. This emulsifier must not contain cyclic inner ether bonds, i.e. it must not be of the ethoxylated sorbitan-derivative type. The hydrophilic emulsifier is suitably selected from the groups consisting of ethoxylated alkylphenols, ethoxylated fatty alcohols, ethoxylated fatty acids, ethoxylated glycol- and glycerol fatty esters and alkylene oxide block-copolymers. In the five first-mentioned groups alkyl and fatty esters, respectively, are present and hereby is to be understood alkyl groups containing at least 8 carbon atoms and fatty rests containing at least 8 carbon atoms. The latter preferably contain between 8 and 22 carbon atoms and can be saturated or unsaturated. The last-mentioned group, the block-copolymers and can more specifically be defined as condensates of ethylene oxide and a hydrophobic base, formed by condensation of propylene oxide and propylene glycol. At least 40 percent by weight of the molecular weight of the block-copolymers should be made up from ethylene oxide units. Preferred hydrophilic emulsifiers are ethoxylated alkylphenols, ethoxylated fatty alcohols and ethoxylated fatty acids. Particularly preferred are the ethoxylated fatty acids. This group does of course comprise as well reaction products of fatty acid and ethylene oxide, as of fatty acid and polyethylene glycol, the last-mentioned reaction products are often referred to as polyethylene glycol esters, and both mono- and di fatty acid esters are included.

The non-ethoxylated emulsifier with an HLB-value below 9, and preferably below 7, is a partial fatty acid ester of polyvalent alcohols having 2 to 8 carbon atoms or anhydro-derivatives of these. The non-ethoxylated emulsifier thus contains at least one free hydroxyl group. The fatty acid rest can be saturated or unsaturated and contains, as above, at least 8 carbon atoms and preferably between 8 and 22 carbon atoms. Suitable polyvalent alcohols, or anhydro derivatives thereof, comprise ethylene glycol, diglycerol and higher glycerols, propylene glycol, butylene glycol, diethylene glycol, triethylene glycol, xylitol, erythritol, pentaerythritol, sorbitol and sorbitan. It is preferred that the lipophilic emulsifier, like the hydrophilic emulsifier, does not contain cyclic inner ether bonds. The lipophilic emulsifier is preferably a partial fatty acid ester of an alcohol originally having not more than three hydroxyl groups and particularly suitable are the partial fatty acid esters of glycerol.

The resulting HLB-value for the emulsifier combination should be within the interval 11-17 and the lipophilic and hydrophilic emulsifiers are thus used in such weight ratios that values within this interval are obtained. A suitable interval for the weight ratio of hydrophilic emulsifier to lipophilic emulsifier is 1:10 to 10:1, preferably 1:1 to 7:1.

The dry content of initiator in the dispersions can reach about 40 percent by weight and is generally above 15 percent by weight. The amount of emulsifier is of course suited to the amount of initiator, and it should generally not exceed 15 percent by weight, as it has been found that the viscosity otherwise might be negatively influenced.

The dispersions according to the invention should have a comparatively low viscosity and thereby be easy to handle. The viscosity should not exceed 1000 cp (measured with Brookfield viscosimeter RVT, spindle 3, 100 r.p.m., at a temperature of 20° C.) and the viscosity is generally below 150 cp. The dispersions are further very stable and this means that the viscosity of the dispersions does not increase substantially during a longer period of storing. Neither do the dispersions, after a longer period of storing, show phase-separation of such a kind that they cannot be used for polymerization.

It is suitable to incorporate substances which function as thickeners and/or protective colloids in the dispersions, in order to prevent that the initiators in the aqueous dispersion can no longer be homogenously distributed in the continuous phase, should phase separation have occurred. These substances are preferably incorporated in most cases, and in such amounts as to prevent phase-separation to the greatest possible extent.

Examples of substances which are suitable for this purpose are synthetic and natural polymers such as polyvinyl alcohol, which may be partially hydrolyzed, polyvinylpyrrolidone, polyacrylic acid, and acrylic acid copolymerizates with acrylic amide or acrylic esters, water-soluble cellulose derivatives such as hydroxyethyl and hydroxypropyl cellulose, methyl cellulose and carboxymethyl cellulose, gelatin, starch etc. The amount of protective colloid is chosen with respect to the desired viscosity of the dispersion, with respect to the emulsifiers and the initiator. The amount is suitably within the range of 0.05-10 percent by weight, based on the dispersion, and preferably within the range of 0.2-2 percent by weight. Polyvinyl alcohol or water soluble cellulose derivatives are preferably used.

The dispersions of the invention are prepared in a known manner by mixing and homogenizing the components by means of known equipment, such as colloid mills, pressure homogenizers, ball mills, ultrasonic homogenizers etc. As peroxides are susceptible to higher temperatures, the temperature at mixing and homogenizing these should not exceed 20° C. to prevent decomposition.

The invention is further illustrated in the following examples which, however, are not intended to limit the same. Parts and percent relates to parts by weight and percent by weight unless otherwise stated.

EXAMPLE 1

20 g of dicetyl peroxydicarbonate were added to 80 g of a water solution containing 0.6 g of polyvinyl alcohol, 0.5 g of ethoxylated oleic acid with an HLB-value of 18.4 and 0.4 g of glycerol dioleate with an HLB-value of 2.9.

The mixture was dispersed by means of an Ultraturrax ® at 10000 r.p.m. and was then homogenized by means of an Ultrasonic homogenizer at a temperature of about 20° C. and at a pressure of about 1000 kPa. The viscosity of the dispersion was 68 cp, measured with a Brookfield viscosimeter type RVT, measuring spindle 3, at 100 r.p.m.

Only a slight increase in viscosity and a slight separation could be noticed after 2 months storage and this means that the dispersion had a very good storage stability.

EXAMPLE 2

30 g of laurylperoxide were added to 70 g of water solution containing 0.4 g of hydroxypropyl methylcellulose, 0.6 g of ethoxylated lauric acid with an HLB-value of 18.8 and 0.2 g of glycerol monolaurate with an HLB-value of 3.0.

A dispersion was prepared in the same manner as in Example 1. The viscosity of the dispersion was 71 cp. A slight separation was noticed after 2 months storage but the peroxide could easily be homogenously distributed in the aqueous phase again by shaking.

EXAMPLE 3

15 g of dicetyl peroxydicarbonate were added to 85 g of a water solution containing 0.4 g of ethylhydroxy ethylcellulose, 0.4 g of sorbitan monostearate with an HLB-value of 4.7 and 1.0 g of ethoxylated stearic acid with an HLB-value of 18.8.

A dispersion was prepared in the same manner as in Example 1. The viscosity of the dispersion was 55 cp. The storage stability of the dispersion was good, i.e. only a slight separation and no increase in viscosity could be noticed after 2 months storage.

EXAMPLE 4

20 g of dicetyl peroxydicarbonate were added to 80 g of a water solution containing 0.5 g of hydroxypropyl methylcellulose, 0.5 g of glycerol monostearate with an HLB-value of 2.7 and 1.0 g of ethoxylated stearic acid with an HLB-value of 17.9.

A dispersion was prepared in the same manner as in Example 1. The viscosity of the dispersion was 75 cp and it showed good stability on storage.

EXAMPLE 5

30 g of dicetyl peroxydicarbonate were added to 70 g of a water solution containing 0.4 g of ethylhydroxyethylcellulose, 0.3 g of glycerol dioleate with an HLB-value of 2.9 and 0.9 g of ethoxylated oleyl alcohol with an HLB-value of 17.7.

A dispersion was prepared in the same manner as in Example 1. The viscosity of the dispersion was 89 cp. The storage stability of the dispersion was good, i.e. only slight separation and no increase in viscosity could be noticed after 2 months storage.

EXAMPLE 6

6300 g of water, 5 g of sorbitan monolaurate, 4 g of hydroxypropyl methylcellulose and different initiator dispersions according to the invention, an initiator dispersion for comparison and initiator in solid form, respectively, were introduced into a 15 l steel reactor. The initiator dispersions were charged in amounts corresponding to 3 g of dry initiator. The agitation speed in the system was 415 r/min. and the temperature was 40° C. 5500 g of vinyl chloride were charged after evacuation, and the system was heated to 55° C.

The polymerization was stopped after about 8 hours, when the pressure was 500 kPa. Unreacted vinyl chloride was blown off and the polymerizate was dewatered and dried.

200 g of the produced polymerizate were mixed with 16 g of tribasic lead sulphate and 100 g of dioctyl phtalate. The mixtures were rolled to a fell for 10 minutes and thereafter pressed into plates at 160° C. and conditioned on a water bath at 23° C. for 4 hours. The volume resistivity was then measured by means of a Radiometer IM6 megohmmeter.

The following dispersions were used in the tests described above:

(a) A dispersion according to Example 1
(b) A dispersion according to Example 2
(c) A dispersion according to Example 5
(d) Comparative example. A dispersion of 17 g of dicetyl peroxydicarbonate, 0.5 g of hydroxypropyl methylcellulose and 0.5 g of ethoxylated nonylphenol, with an HLB-value of 13.3, in 82 g of water, the dispersion having been prepared in the same manner as in Example 1.

(e) Comparative example. A dispersion of 15 g of dicetyl peroxydicarbonate, 0.4 g of ethylhydroxy ethylcellulose, 0.3 g of sorbitan monolaurate with an HLB-value of 8.6 and 0.4 g of ethoxylated sorbitan monolaurate with an HLB-value of 16.7, in 83.9 g of water, the dispersion having been prepared in the same manner as in Example 1.

A polymerizate, produced and treated in the same manner as above but for which the same amount of dicetyl peroxydicarbonate had been added to the polymerization system in powder form, was used as a reference in each test.

The measurements were made both on polymerizates prepared with fresh dispersions and with the same dispersions after they had been stored for 2 months. In the table below, the dispersions which had been stored are indicated with index 1. The values for the volume resistivity which are shown in the table, are mean values of five measurements.

| Dispersion | Volume Resistivity $\times 10^{10}$ ohm · m |
|---|---|
| a | 68 |
| reference | 58 |
| b | 63 |
| reference | 55 |
| c | 49 |
| reference | 52 |
| d, comparative | 15 |
| reference | 55 |
| e, comparative | 33 |
| reference | 55 |
| $a_1$ | 62 |
| reference | 55 |
| $b_1$ | 63 |
| reference | 56 |
| $d_1$, comparative | 12 |
| reference | 56 |

We claim:

1. A method in the polymerization of ethylenically unsaturated monomers in aqueous systems wherein a solid, monomer-soluble, free-radical forming compound is used as initiator and this is added to the polymerization system in the form of an aqueous dispersion, characterized in that the initiator dispersion comprises an emulsifier system consisting of (a) an ethoxylated nonionic emulsifier with an HLB-value above 15, which emulsifier does not contain cyclic inner ether bonds, and (b) a non-ethoxylated nonionic emulsifier with an HLB-value below 9, whereby the resulting HLB-value of the emulsifier blend is within the range of 11–17 and whereby the total amount of emulsifier is at least 1 percent by weight, based on the initiator.

2. A method according to claim 1, characterized in that the non-ethoxylated emulsifier in the dispersion is a partial fatty acid ester of an alcohol having not more than three hydroxyl groups.

3. A method according to claim 1, characterized in that the ethoxylated emulsifier is an ethoxylated alkylphenol, an ethoxylated fatty alcohol or an ethoxylated fatty acid.

4. A method according to any one of claims 1–3, characterized in that the solid initiator is an organic peroxide.

5. An aqueous dispersion of a solid, monomer-soluble, free-radical forming initiator, which dispersion is suitable for the polymerization of ethylenically unsaturated monomers in aqueous systems, characterized in that it comprises an emulsifier system consisting of (a) an ethoxylated nonionic emulsifier having an HLB-value above 15, which emulsifier does not contain cyclic inner ether bonds, and (b) a non-ethoxylated nonionic emulsifier with an HLB-value below 9, whereby the resulting HLB-value of the emulsifier blend is within the range of 11–17 and whereby the total amount of emulsifier is at least 1 percent by the weight based on the initiator.

6. A dispersion according to claim 5 characterized in that the ethoxylated emulsifier is an ethoxylated alkylphenol, an ethoxylated fatty alcohol or an ethoxylated fatty acid.

7. A dispersion according to claim 5, characterized in that HLB-value of the ethoxylated emulsifier is above 17.

8. A dispersion according to claim 5 characterized in that the non-ethoxylated emulsifier is a partial fatty acid ester of an alcohol having not more than three hydroxyl groups.

9. A dispersion according to claim 5, characterized in that the non-ethoxylated emulsifier has an HLB-value below 7.

10. A dispersion according to any one of claims 5 to 9, characterized in that it contains 0.05 to 10 percent by weight, based on the dispersion, of a thickener.

* * * * *